3,265,609
WAX REFINING
Robert J. Convery, Wilmington, Del., assignor to Sun Oil Company, Philadelphia, Pa., a corporation of New Jersey
Filed July 27, 1962, Ser. No. 212,887
4 Claims. (Cl. 208—26)

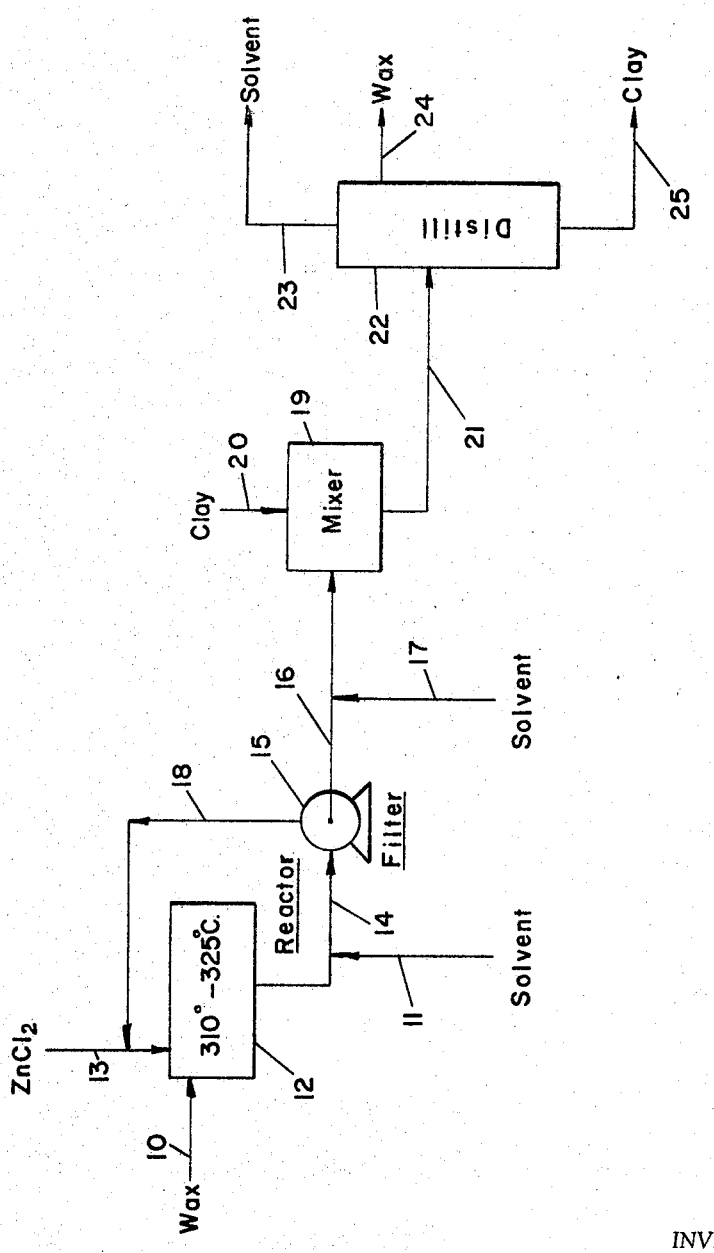

This invention relates to a process for refining wax. More specifically, the present invention relates to a process for decolorizing and deodorizing waxes. Basically, this invention is concerned with improvements in the manufacture of high-quality petroleum waxes; and, particularly with the production of waxes of superior quality with respect to color, odor, and stability.

Petroleum waxes are generally obtained by separation thereof from lubricating oil fractions obtained in petroleum refining, usually by chilling oil fractions and separating the precipitated wax. Various processes for purifying the separated wax, such as sweating or crystallization from solvents to de-oil the wax, have been frequently described in the prior art. In such processes the wax charge frequently has a foul odor which is carried over into the final product. Additionally, the wax product frequently is of an undesirable dark color, from light yellow to dark brown. Improvements in odor and color have heretofore been obtained by treatment of the wax with solid adsorptive materials such as bauxite, fuller's earth, other clays and/or active adsorbents. In these prior art purifying process, it has heretofore frequently been necessary to employ excessive quantities of adsorptive materials in order to achieve the desired results, or to employ an additional step or steps such as treatment with sulfuric acid prior to the contacting with clay.

Undesirable color and odor are generally the result of small amounts of impurities present in the wax. While the nature of these impurities is not known with particularity, it is generally conceded that they include certain oxygenated compounds, as well as aromatic and naphthenic materials. Some of these impurities are present in the residual oil and others are present in the normally solid components. Proper refining steps or techniques are required in order to removed these impurities; and, it is with improvements in this aspect of wax refining that this present invention is directed. As used herein, the term "color bodies" is intended to include all of the wax impurities which contribute to undesirable color and odor of the wax product.

An object of the present invention is to provide a rapid and commercially feasible process for the decolorization and deodorization of waxes.

A further object is to provide a process wherein the quantity of solid adsorbent required for the decolorization and deodorization of waxes is substantially reduced.

Another object is to prepare a wax product of good color and odor characteristics.

Other objects wil more fully appear to those skilled in the art from the following description of the invention.

According to the present invention, these and other objects, are accomplished by treating the wax feed containing color bodies with a zinc chloride catalyst in order to transform the color bodies into a more readily removable form with subsequent treatment of the wax with an adsorptive clay in an amount sufficient to remove the transformed color bodies from the wax.

Waxes which may be purified in accordance with the present processes are waxes which are usually derived from a petroleum source including paraffin and microcrystalline waxes ranging in melting point from about 100° F. to 200° F. The process of the present invention has been found particularly effective with high-melting point microcrystalline waxes.

The usual method that is employed for decolorizing waxes is to percolate the molten waxes through a bed of an adsorbent material at temperatures sufficiently high to keep the wax in a liquid state. Additionally the color bodies can be removed by contact filtration wherein the wax is admixed with an adsorbent with the mixture subsequently filtered in a conventional manner. Various solid adsorbents which may be employed in the present invention are the adsorptive clays such as fuller's earth, bauxite, bentonite, synthetic aluminum silicate, and the like. Preferentially clays which have from 5% to 12% weight of free moisture are quite effective. Clays commercially available normally have moisture contents within the stated ranges. The quantity of adsorbent to employ in the present process varies according to the characteristics of the wax to be treated. It will also vary with the type of adsorbent employed, the residence time in the soaking tank, and the temperature of adsorption. In general, however, the quantity of adsorbent will be from 5 to 60 pounds of clay per barrel of wax, and usually within the range of from 10 to 40 pounds of clay per barrel of wax. The residence time, i.e. the time of contact of the wax and adsorbent, will vary from about .5 to 3 hours. The temperature during the contacting of wax and adsorbent will vary according to the hereinabove mentioned variables and the type of wax. In general, the temperature of adsoprtion will be in the range of from 150° F. to 350° F.

The pre-treatment of the wax with zinc chloride is carried out at a temperature substantially above the melting point of the wax and will be in the range of from 482° F. to 752° F. Preferably the temperature will range from 572° F. and 662° F. The pressure during this pre-treatment stage may be either super-atmospheric, e.g. 50 to 100 atmospheres or sub-atmospheric depending upon say, the desirability of using a solvent during the pre-treatment stage. It is distinctly preferable, however, to operate this process at atmospheric pressure. Additionally, it is believed that the presence of a small amount of moisture and/or free oxygen would increase the effectiveness of the pre-treatment step. It is to be noted that the zinc chloride acts entirely as a catalyst for the transformation of color bodies present in the wax which are normally difficult to remove by conventional clay treatment into a form which is more readily removable by clay contacting. As a result, the zinc chloride is easily recoverable from the reaction mixture and can be, therefore, reused in the process.

The yield of wax obtained from the process practiced according to this invention will of course depend upon the color of the wax feed and the desired color of the products obtained. Generally paraffin waxes are decolorized to a color shade of +30 on the Saybolt Chromometer. Thus, if wax feed to the decolorizing operation has a −2 Saybolt color, a yield of approximately 30 pounds of clay per barrel of wax will be used to produce a product having a +30 color. On the other hand, when the feed has a color rating of +20 Saybolt, a yield of 10 pounds of clay per barrel of wax would be expected.

The present invention may be more readily understood by reference to the accompanying drawing which is a schematic flow diagram to illustrate one embodiment of the present invention.

Molten waxes and zinc chloride are introduced through lines 10 and 13 respectively into mixing tank 12 which is provided with agitating means (not shown) and which is maintained at atmospheric pressure and a temperature between 590° F. and 617° F. The resulting mixture is allowed to remain in the mixing tank for a period of 1 to 12 hours. From mixer 12 the mixture passes through line 14 into filter 15. Zinc chloride is removed therefrom via line 18 and preferably is re-cycled back to the mixing tank 12 via line 13. The molten wax plus tranformed color bodies leave filter 15 and pass through line 16 into mixer 19. Adsorptive clay in an amount sufficient to remove the color bodies from the wax is introduced into mixer 19 via line 20. The mixture of clay and molten wax is then passed via line 21 into distillation tower 22. The decolorized wax is recovered through line 24 and the used clay is removed through line 25. Any solvent present from, say, a prior de-oiling operation is recovered overhead through line 23. If necessary or desirable, the purified wax may be subjected to additional operations such as heating to remove any traces of moisture and the like. If desirable or necessary, solvent can be pumped into the system via line 11 and/or line 17 in order to aid either the filtration process or the decolorizing process.

Valves, pumps, heat exchangers, control means and the like, the operation and location of which will be apparent to those skilled in the art, have been omitted from the diagram.

As demonstrated by the following examples, operating in accordance with the process of the present invention, would decrease the quantity of solid adsorbent normally required to decolorize and deodorize given wax stock. On the other hand, the present invention will also provide a means of decolorizing and deodorizing wax stocks which have heretofore been virtually impossible to accomplish with conventional clay contacting. The reason for these enhanced results is not known with certainty. It is believed, however, that the color bodies are transformed by a zinc chloride catalyst into forms which are more strongly adsorbed by the action of the subsequent clay treatment.

The following example illustrates the process of the present invention:

*Example*

A microcrystalline wax having a melting point of approximately 190° F. and a black color (7½ diluted NPA color) was heated with solid zinc chloride at 590° F. to 617° F. for 10 to 12 hours. The wax was then dissolved in boiling normal hexane and the mixture filtered. When the solvent was removed, the resulting wax had a dark yellowish-brown color.

This wax was then re-dissolved in normal hexane and treated with 25 pounds of clay per barrel of wax. The final wax product was white in color. The yield of white wax was 90+ precent with virtually no change in the melting point.

Without the zinc chloride pre-treatment, it would be expected that at least 55 pounds of clay per barrel of wax would have been needed to substantially decolorize the wax, and even then, a light brown colored wax would have been produced.

The invention claimed is:
1. Process of decolorizing wax which comprises:
    (a) treating liquified wax with zinc chloride catalyst in an amount sufficient to transform the color bodies in the wax into a more readily removable form, and at a temperature of from 482° F. to 752° F.,
    (b) separating the zinc chloride catalyst from the wax,
    (c) contacting the liquified wax in a second step with adsorptive clay in an amount sufficient to remove the color bodies from the wax, and,
    (d) recovering wax which has been substantially decolorized.
2. Process according to claim 1 wherein the wax is treated with zinc chloride at a temperature of from 572° F. to 662° F.
3. Process according to claim 1 wherein the wax is contacted in said second step with 5 to 60 pounds of said clay per barrel of wax.
4. Process according to claim 2 wherein the wax is contacted in said second step with 5 to 60 pounds of said clay per barrel of wax.

References Cited by the Examiner
UNITED STATES PATENTS

| | | | |
|---|---|---|---|
| 1,277,092 | 8/1918 | McAfee | 208—27 |
| 2,028,472 | 1/1936 | Rabe | 208—26 |
| 2,079,887 | 5/1937 | Voorhees | 208—27 |
| 2,273,846 | 2/1942 | Dunmire | 208—299 |
| 2,327,155 | 8/1943 | Pollock | 208—27 |
| 2,329,785 | 9/1943 | Pool | 208—27 |

DELBERT E. GRANTZ, *Primary Examiner.*
ALPHONSO D. SULLIVAN, PAUL M. COUGHLAN,
*Examiners.*
H. LEVINE, *Assistant Examiner.*